United States Patent Office 3,523,730
Patented Aug. 11, 1970

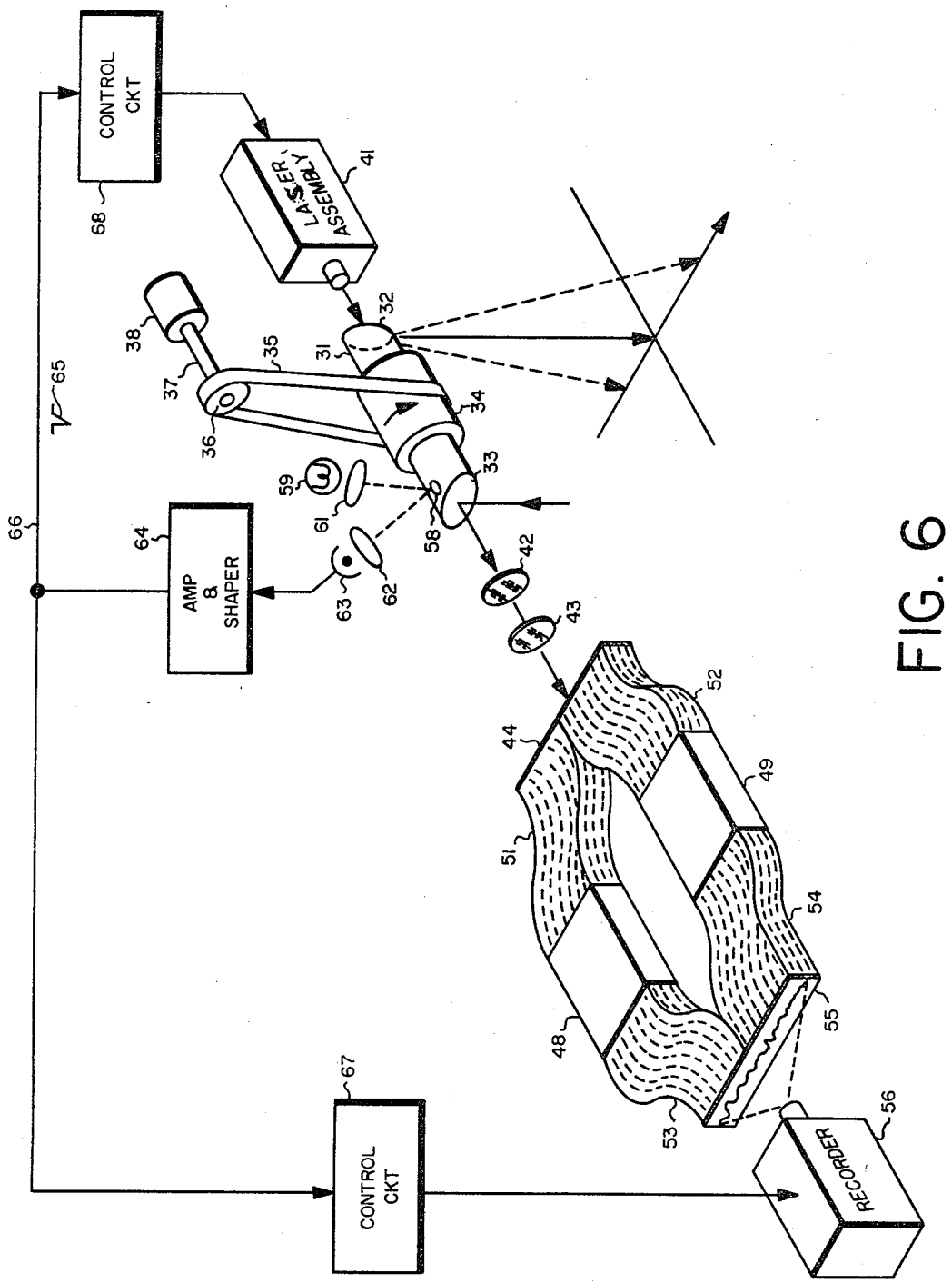

3,523,730
OPTICAL OBJECT LOCATING SYSTEM
Arthur F. Hayek, Pleasantville, Gus Stavis, Briarcliff Manor, and Thomas W. Odell, Pearl River, N.Y., assignors to Singer-General Precision, Inc., a corporation of Delaware
Filed Feb. 5, 1964, Ser. No. 342,617
Int. Cl. G01c 3/20
U.S. Cl. 356—4
10 Claims This invention relates generally to an object locating system using optical techniques, sometimes called optical radar, and particularly to such a system which displays the direction and distance of a plurality of objects from an observation station.

The familiar microwave radar system transmits short pulses of microwave energy in a narrow beam with a scanning motion across a field of view. A portion of the energy is received after reflection from each object. The direction of each object is determined by the direction from which the corresponding echo arrives; the range is determined by the time elapsing between the transmission of each pulse and the reception of its echo.

Microwave radar systems are very useful and are widely used but are subject to a limitation as to the resolution obtainable. This limitation is due largely to the difficulty in obtaining a narrow beam of energy. For example, an X band system with a wavelength of about 3 cm. using an antenna one meter in diameter can produce a beam no narrower than about 1½ or 2 degrees. Since beamwidth is directly proportional to wavelength and inversely proportional to antenna diameter, an optical system with its short wavelengths becomes attractive.

Although noncoherent light has very short wavelengths, it is still difficult to obtain a very narrow beam because available sources are far from "point" sources. Extremely narrow beams can be generated only by stopping down the optical system with the result that as the beam becomes narrower, less and less of the light from the source it utilized.

The development of lasers, which inherently generate a very narrow beam, appears to overcome the beamwidth problem since, with suitable optics, the beamwidth can be made as narrow as appears to be desirable for present purposes. The resolution problem is greatly diminished and in addition, as will be more fully explained, the narrow beamwidths obtainable make it unnecessary to rely on pulse techniques to determine range.

It is a general object of the invention to provide an improved object locating system.

Another object is to provide an optical system for displaying the direction and distance of a plurality of objects from an observation station.

Another object is to provide an optical object locating system the operation of which does not depend upon ambient light.

Another object is to provide an object locating system in which range is determined without reliance on pulse techniques.

Briefly stated, the invention employs either continuous wave, or "long pulse" lasers that is, lasers in which the duration of each pulse is long compared to the time required for light to be propagated from the observation station to the object and back again. Range is measured by scanning a narrow beam across a field of view which includes the object the range of which is to be determined. Energy reflected from the object is received and the direction from which the echo is recevied is compared with the direction of transmission at the time of reception. The angular difference is a measure of range. In one specific embodiment of the invention, first and second mirrors are rotated in synchronism. A narrow beam of energy from a source is reflected from the first mirror, thereby scanning a predetermined field of view including the object. Light reflected from this field of view is imaged after reflection by the second mirror. It has been found that the linear distance of the image of any object from the optical center of the imaging apparatus is very nearly proportional to the angular difference between the direction of reception and the direction of transmission at the time of reception. This linear distance is therefore very nearly proportional to range. In addition, the angular direction of the image of any object is very nearly equal to the angular direction of the object from the apparatus. In short, the received image is a plot in polar coordinates of the position of the various objects in the scanned field of view.

For a clearer understanding of the invention, reference may be made to the following detailed description and the accompanying drawing, in which:

FIGS. 1, 2 and 3 are schematic diagrams useful in explaining the invention;

FIG. 4 is a schematic diagram of one embodiment of the invention;

FIG. 5 is a schematic diagram illustrating one function which may be performed by the invention;

FIG. 6 is a schematic diagram of another embodiment of the invention; and

FIG. 7 is a schematic showing of a portion of the apparatus of FIG. 6.

FIGS. 1, 2 and 3 represent a simple case and show how range can be determined. An observation station at O includes a narrow beam source and a receiver. The narrow beam and the axis of the receiver point in the same direction and are rotated at a constant angular speed $\omega$. A target T is shown at a range R and at a bearing $\theta$. At the instant illustrated in FIG. 1, the beam is directed toward the target T and the light which will illuminate the target is just leaving O, as shown by the small arrow. A short time later, as indicated in FIG. 2, the light from O will have reached T, but the beam will now be directed at a bearing angle $\theta + \phi/2$. Let us denote the time elapsing between the conditions illustrated in FIGS. 1 and 2 by $t_1$. This time is obviously $$t_1 = \frac{R}{c} \tag{1}$$

where $c$ is the velocity of light. Also, $\phi/2$ can be expressed as $$\phi/2 = \omega t_1 \tag{2}$$

FIG. 3 illustrates the situation after passage of another time interval $t_1$. Light reflected from the target T has just reached O. The beam is now directed at a bearing $\theta + \phi$. The angle $\phi$ is the angle between the direction of arrival of the light reflected from T and the direction of transmission at the time of arrival. Obviously, $$\phi = 2\omega t_1 \tag{3}$$

From Equations 1 and 3, $$R = \frac{c\phi}{2\omega} \tag{4}$$

Since $c$ and $\omega$ are constant, range can be determined by measuring $\phi$.

FIG. 4 illustrates a simple arrangement for utilizing the principles discussed above. Two plane mirrors 11 and 12 are mounted on a common axis, or on two parallel axes, perpendicular to the plane of the paper, and are rotated at a substantially constant speed $\omega_1$ by a motor 13. Above the mirror 11 is mounted a source 14 such as a laser which generates a narrow beam of light directed downward to the mirror 11. As the mirrors rotate, the beam is swept over a field of view. Above the mirror 12 is a lens system 15 and an image plane 16. With the mirrors in the position shown, light from the source 14 is reflected by the mirror 11 and transmitted in a beam 17 at a bearing $\theta$ toward a target. Light reflected from the target reaches the mirror 12. If the target were at zero range, the lens 15 would form an image in the plane 16 at the point A on the optical axis 18. But if the target is at any range greater than zero, a time interval $t_1$ is required for light to be propagated from the mirror 11 to the target and another time interval $t_1$ is required for propagation from the target to the mirror 12. During the interval $2t_1$ the mirrors 11 and 12 will be rotated through an angle $2\omega_1 t_1$ to the positions shown by the dotted lines 11' and 12' respectively. Accordingly, the light reflected from the target is reflected from the mirror 12 in an off-axis direction as indicated by the ray 19 and an image of the target is formed in the image plane 16 at point B displaced from the axis 18.

The beam 17 obviously rotates at an angular velocity $\omega$ which is twice the angular velocity of the mirrors 11 and 12. Thus, in the interval $2t_1$, the beam rotates through an angle $\phi = 2\omega t_1 = 4\omega_1 t_1$ which angle represents the difference between the direction of arrival of reflected energy and the direction of transmission of energy at the time of arrival. This angle is the same magnitude as the angle between the optical axis 18 and the ray 19. Range may be expressed, as in the case discussed in connection with FIGS. 1–3, as $$R = \frac{c\phi}{2\omega} = \frac{c\phi}{4\omega_1} \tag{5}$$

The distance from the optical axis 18 in the image plane 16 may also be calibrated to indicate range, taking into consideration the characteristics of the lens 16 and the angular velocities used.

An embodiment of the invention will now be described in connection with apparatus for gathering data for map making. This apparatus is designed to determine and record successive profiles of the terrain beneath a low flying aircraft.

FIG. 5 shows an aircraft 25 flying horizontally at an altitude $h$ above the terrain. A narrow beam of light rotates continuously in a plane perpendicular to the velocity vector thereby scanning successive narrow strips of terrain, such as the strip 26, as the aircraft flies above. The apparatus displays and records the direction, the distance, and the reflectivity of each elemental area of each strip, thereby generating representations of successive profiles.

FIG. 6 shows schematically the apparatus aboard the aircraft. There is shown a cylindrical glass rod 31 having opposite ends beveled at 45 degrees with the plane faces silvered to form mirrors 32 and 33. The rod 31 is rotated at a substantially constant speed, the arrangement shown comprising a sleeve 34 fastened to the rod 31 and engaged by a belt 35 driven by a pulley 36 fastened to the shaft 37 of a motor 38. The axis of the cylindrical rod 31 is parallel to the longitudinal axis of the aircraft (which is a sufficiently close approximation to the velocity vector).

A source of narrow beam coherent light, such as the laser assembly 41, is mounted to direct a beam along the axis of the rod 31 to the mirror 32. As the mirror rotates, the reflected beam rotates at the mirror speed in a plane perpendicular to the axis of the rod 31, thereby scanning one profile each revolution. The optical of the laser assembly 41 may be thought of as comprising not only the axial portion but also the reflected beam portion which rotates continuously.

On the axis of the rod 31 opposite the mirror 33 is a narrow band filter 42 which passes only light at or near the wavelength of the light emitted by the laser assembly 41. Adjacent to the filter 42, and also on the axis of the rod 31, is a lens 43 for focusing incident light on an image plane 44. The optical axis of the lens 43 may also be thought of as comprising not only an axial portion but also the portion reflected by the mirror 33. The faces of the mirrors 32 and 33 are oriented, as shown, so that the optical axis of the lens 43 is always parallel to that of the laser assembly 41 and rotates in synchronism therewith. Light arriving from any point then lying on the optical axis is imaged at the intersection of the optical axis with the image plane 44. But only points at zero range are illuminated while on the axis because of the transit time delay of the light from the laser assembly 41 to the point and back to the image plane 44, during which time the optical axis rotates. Therefore, each point on the terrain is imaged in the plane 44 at some position displaced from the optical axis. It is noted that the reflected portions of the optical axes of the laser assembly 41 and the lens 43 are parallel and, strictly speaking, never intersect, so that it appears that a point illuminated by the laser assembly 41 could not be imaged by the lens 43. But when it is realized that the separation between the mirrors 32 and 33 is a few inches at most while the range would be of the order of hundreds or thousands of feet, it becomes apparent that any reasonable beamwidths of the transmitting and receiving systems cause substantially complete overlapping, and that the small separation of the mirrors 32 and 33 is insignificant.

FIG. 7 shows the image plane 44. The point P represents the optical axis and the line 46 is a vertical reference line. The point Q represents the image of any point on the strip of terrain being scanned. Analysis of the system shows that:

(1) The distance R from the point P to the point Q is very nearly porportional to the range of the point; and
(2) The angle $\beta$ is very nearly equal to the angle of arrival of the signal. In other words, the angle of the prism 33 at the time of arrival of the reflected signal, is very nearly equal to the angle of arrival of such reflected signal.

As the beam scans across each strip, all the points are imaged in the plane 44 and constitute a plot in polar coordinates of the position of the various points. The brightness of each point on the image is indicative of the reflectivity of the corresponding point on the ground.

Returning to FIG. 6, the image in the plane 44 is quite feeble and requires intensification. It would be possible to place the input face of an image intensifier tube directly in the image plane 44, and thereby obtain an intensified replica. In some cases, however, the currently available image intensifiers have insufficient resolution and accordingly it is at present preferred that the image in the plane 44 be divided among as many intensifiers as is necessary to preserve the resolution. Shown are two image intensifier tubes 48 and 49 such as those obtainable commercially from several suppliers. One satisfactory kind of obtainable from Westinghouse Electric Corporation, Pittsburgh, Pa., and is designated Model No. WX–4826. The image from plane 44 may be split by bundles of optical fibers. One such bundle 51 has one end abutting one half of the image plane 44 and the other end abutting the input face of the intensifier tube 48. Another similar bundle 52 transmits the image from the other half of the plane 44 to the tube 49. Similar bundles 53 and 54 reconstitute the split, intensified image from the tubes 48 and 49 in the image plane 55. A recorder 56, such as a motion picture camera or a television recording system, makes a permanent record of each profile as it appears on the plane 55.

Synchronizing of the rotation of the mirrors 32 and 33, the laser assembly 41 and the recorder 56 may be accomplished in several ways, a preferred arrangement being that shown wherein a small flat spot 58 is formed on the cylindrical rod 31 and silvered to form a mirror. Light from a lamp 59 is focused by a lens 61 onto the spot 58 and is refocussed after reflection by a lens 62 upon a photosensitive device 63. The device 63 generates a signal once each revolution of the rod 31 which signal is amplified and shaped by a circuit 64 to form a sharp pulse 65 on a conductor 66. This pulse operates through a control circuit 67 to synchronize the operation of the recorder 56 with the generation of each profile image.

The laser assembly 41 comprises one or more lasers as required to obtain the necessary power. They could operate continuously, in which case no synchronizing would be required, but such operation would be wasteful of power and it is preferred that the lasers operate only when the beam is directed toward the ground. Accordingly, the pulse 65 is also applied to a control circuit 68 which controls the operation of the laser assembly 41. Additionally, the assembly 41 preferably comprises an arrangement to provide substantially uniform received power as the beam is swept. This requires the familiar cosecant squared power distribution as a function of beam angle which can be approximated by several lasers, an increasing number of which operate as range increases. However, the details of the laser assembly 41 are not a part of the instant invention, it being sufficient for present purposes that the assembly 41 provide a narrow beam directed along the axis of the cylindrical rod 31 as previously discussed.

In summary, the present invention determines both range and bearing with a continuous wave or "long pulse" system. Range accuracy is not affected by jitter in the timing pulses. The optical system is simple because no beam forming lenses or mirrors are required. The profile mapping system described creates an image directly in polar coordinates.

Although a specific embodiment has been described for illustrative purposes, many modifications will occur to those skilled in the art. It is therefore desired that the protection afforded by Letters Patent be limited only by the true scope of the appended claims.

What is claimed:

1. Airborne apparatus for gathering data for map making, comprising,
    first and second plane mirrors,
    said mirrors comprising the surfaces of oppositely inclined 45 degree bevels formed on opposite ends of a cylindrical rod,
    said rod being installed with its axis parallel to the longitudinal axis of an aircraft,
    means for rotating said rod about its axis at a substantially constant speed,
    a source of radiant energy positioned opposite said first mirror for transmitting a narrow beam of energy along the axis of said rod to said first mirror, whereby the energy reflected by said first mirror scans successive strips of terrain beneath said aircraft,
    an image plane perpendicular to the axis of said rod opposite said second mirror,
    a lens system including said second mirror with its optical axis coincident with the axis of said rod for forming images on said image plane of said strips of terrain, whereby the locations of the axis of each of the images of the various elements of each strip with respect to the axis of said rod comprise a polar coordinate representation of the location of said elements with respect to said aircraft, and whereby the brightness of each elemental image represents the reflectivity of the corresponding elemental area, and
    means synchronized with the rotation of said rod for recording the images of said strips successively.

2. Apparatus according to claim 1 in which said source comprises a generator of a narrow beam of coherent light of substantially a single wavelength.

3. Apparatus according to claim 2 further comprising a narrow band filter positioned in the path of light reaching said image plane for passing only light at or near the wavelength of the light generated by said source.

4. Apparatus for displaying the range of objects in a field of view comprising;
    first and second mirrors each having no more than a single plane surface each and mounted in fixed angular relationship to each other on a common axis,
    a source for transmitting a narrow beam of radiant energy toward said first mirror for illuminating a portion of said field of view, the position of the portion so illuminated being dependent upon the rotational position of said first mirror on said axis,
    an optical system, including said second mirror for receiving radiant energy re-reflected by objects in said portion of said field so illuminated, said second mirror positioned and oriented for forming an image of objects within the illuminated portion whereby the axis of said image is coincident with said common axis when said mirrors are stationary,
    means for rotating said mirrors in synchronism with each other at a known speed whereby said beam of radiant energy reflected by said first mirror scans said field of view and the energy re-reflected by objects within said field of view so scanned is received by said second mirror after rotational movement of said mirrors, the amount of which is dependent upon the range of the objects within that portion of the field of view so illuminated during said scan and whereby the rotational movement of said mirrors between the time of transmission and the time of reception of the same energy displaces the image so formed from said common axis in accordance with the range of the object and said displacement is a measure of range.

5. Apparatus in accordance with claim 4 in which said mirrors comprise the surfaces of oppositely inclined 45 degree bevels formed on the opposite ends of a cylindrical rod and in which said common axis is the axis of said cylindrical rod.

6. Apparatus for displaying the range of objects in a field of view including;
    first and second mirrors each having no more than a single plane surface each and mounted at opposite ends of an axle, said mirrors being mounted in fixed angular relationship to each other with said mirrors and said axle having a common axis,
    a source for transmitting a narrow beam of radiant energy toward said first mirror for illuminating a portion of said field of view, the position of the portion so illuminated being dependent upon the rotational position of said axle,
    an optical system, including said second mirror for receiving radiant energy re-reflected by objects within said portion of said field of view so illuminated, said second mirror positioned and oriented for forming an image of objects within the illuminated portion whereby the axis of said image is coincident with said common axis when said axle is stationary,
    means for rotating said axle at a known speed whereby said beam of radiant energy reflected by said first mirror scans said field of view and the energy re-reflected by objects within said field so scanned is received by said second mirror after rotational movement of said axle, the amount of which is dependent upon the range of objects within that portion of the said field so illuminated during said scan and whereby the rotational movement of said axle between the time of transmission and the time of reception of the same energy displaces the image so formed from said common axis in proportion to the range of said object.

7. Apparatus in accordance with claim 6 in which said mirrors comprise the surfaces of oppositely inclined 45 degree bevels formed on opposite ends of said axle.

8. A ranging system comprising;
    first and second mirrors each having no more than a single plane surface each and mounted at fixed angular relationship to each other on a common axis,
    means for rotating said mirrors in synchronism with each other at a known rate on said common axis,
    a light transmitting system including said first mirror for transmitting a beam of light for illuminating a portion of a field of view when said mirrors are stationary and for scanning said field of view when said mirrors are rotating, light means receiving system including said second mirror for forming images of objects located in said field in response to reflection of light from the illuminated portion in which that object is located, said receiving system being mounted so that the optical axis, including the axis of the images so formed, is coincident with said common axis when said mirrors are stationary and the said axis of the said image so formed is displaced from said common axis proportionally in accordance with the range of said object when said mirrors are rotating.

9. Object locating apparatus comprising:

first and second plane mirrors mounted perpendicular to each other, means for rotating said mirrors at a substantially constant speed about an axis which intersects both said mirrors at equal angles, a source for generating and transmitting a narrow beam of radiant energy along said axis to said first mirror for reflecting said energy toward a field of view and for illuminating a portion of said field and for scanning said field in response to rotation of said mirrors by said rotating means, said field of view being perpendicular to said axis, an image plane member perpendicular to said axis, a lens positioned with its axis coincident with the rotational axis and cooperating with said second mirror, means for forming images on said image plane member of objects within said field of view in response to re-reflection of said radiant energy to said second mirror from portions of said field so illuminated whereby the location of the axis of each said image with respect to the said rotational axis is a polar coordinate representation of the position of the object so imaged with respect to said apparatus.

10. Apparatus in accordance with claim 9 in which said mirrors comprise the surfaces of oppositely inclined 45 degree bevels formed on opposite ends of a cylindrical rod and in which said axis is the axis of said cylindrical rod.

References Cited

UNITED STATES PATENTS

| | | | |
|---|---|---|---|
| 2,399,017 | 4/1946 | Goldman | 340—1 |
| 2,858,453 | 10/1958 | Harris | 250—201 |
| 2,873,381 | 2/1959 | Lauroesch | 250—236 |
| 3,000,256 | 9/1961 | Hyde. | |
| 3,001,187 | 7/1961 | Hammond et al. | |
| 3,019,292 | 1/1962 | John. | |
| 3,109,057 | 10/1963 | Slavecki | 178—6.5 |

RODNEY D. BENNETT, Primary Examiner

J. P. MORRIS, Assistant Examiner

U.S. Cl. X.R.

178—616